United States Patent [19]

Kurimura et al.

[11] 3,905,867

[45] Sept. 16, 1975

[54] METHOD OF PRODUCING L-LYSINE BY FERMENTATION

[75] Inventors: Yasuo Kurimura; Yoshio Furutani, both of Yokohama; Nobuyoshi Makiguchi, Fujisawa; Kenji Souda, Uji, all of Japan

[73] Assignee: Mitsui Toatsu Chemicals, Incorporated, Tokyo, Japan

[22] Filed: Jan. 17, 1973

[21] Appl. No.: 324,319

[30] Foreign Application Priority Data

| | | |
|---|---|---|
| Jan. 21, 1972 | Japan | 47-7632 |
| Jan. 21, 1972 | Japan | 47-7633 |
| Jan. 21, 1972 | Japan | 47-7634 |

[52] U.S. Cl. .................... 195/28 R; 195/29; 195/47; 195/49

[51] Int. Cl.² .................... C12D 13/06

[58] Field of Search .............. 195/28 R, 29, 47, 112, 195/49

[56] References Cited

UNITED STATES PATENTS

| | | | |
|---|---|---|---|
| 3,595,751 | 7/1971 | Nakayama et al. | 195/29 X |
| 3,616,218 | 10/1971 | Shiio et al. | 195/29 |
| 3,708,395 | 1/1973 | Nakayama et al. | 195/112 X |
| 3,711,374 | 1/1973 | Tanaka et al. | 195/28 R |

OTHER PUBLICATIONS

Bekers et al., "Production of Lysine Feed Concentrates," cited in Chemical Abstracts 73:97355n.

*Primary Examiner*—Lionel M. Shapiro
*Assistant Examiner*—R. B. Penland
*Attorney, Agent, or Firm*—Browdy and Neimark

[57] ABSTRACT

L-lysine is accumulated by -L-alanine, an L-lysine-producing mutant which belongs to one of the genera Brevibacterium, Corynebacterium and Arthrobacter and is resistant to one of the metabolic antagonists consisting of a. L-lysine hydroxamate,
b. S-(β-aminoethyl)-L-cysteine hydroxamate,
c. 3-(β-aminoethyl-sulfinyl)-L-alanine (S-dl),
d. 3-[S-methyl-S-(β-aminoethyl)-thio]-L-alamine,
e. S-β-(2-pyridyl)ethyl-L-cysteine, and
f. S-β-(4-pyridyl)ethyl-L-cysteine, in a medium.

6 Claims, No Drawings

METHOD OF PRODUCING L-LYSINE BY FERMENTATION

FIELD OF THE INVENTION

This invention relates to a novel method of producing L-lysine by fermentation. More particularly, it relates to a method of producing L-lysine by fermentation culturing microorganisms having a specific new L-lysine analogue resistant property.

BACKGROUND OF THE INVENTION

It is well known that L-lysine is an indispensable amino acid for human and animal nutrition, and it is expected that L-lysine has a wide use as an additive for the enrichment of food and foodstuffs.

Illustrative of prior processes for the preparation of L-lysine are the disclosures of U.S. Pat. No. 2,979,439 granted Apr. 11, 1961 and British Patent 1,258,380 granted Dec. 30, 1971. In the former case the L-lysine producing bacteria is a mutant which requires for its growth an amino acid with a relationship to L-lysine biosynthesis such as a homoserine-requiring mutant of Micrococcus glutamicus. In the latter case, the L-lysine producing bacteria is a mutant which has a resistance to S-(2-Amino ethyl)-L-cysteine, which is a sulfur analogue of L-lysine.

It is an object of this invention to produce L-lysine at a low cost from readily available raw materials.

DESCRIPTION OF THE INVENTION

The inventors have found that L-lysine analogues which consist of a. L-lysine hydroxamate,
b. S-(β-Amino ethyl)-L-cysteine hydroxamate,
c. 3-(β-Amino ethyl-sulfinyl)-L-alanine (S-dl),
d. 3-[S-Methyl-S-(β-amino ethyl)-thio]-L-alanine,
e. S-β-(2-Pyridyl)ethyl-L-cysteine, and
f. S-β-(4-Pyridyl)ethyl-L-cysteine, have a physiological activity as L-lysine metabolic antagonist, and found that, when a mutant which has a resistance to one of these metabolic antagonists, is cultured in a suitable culturing medium, L-lysine is produced and accumulated in a large amount. The L-lysine produced is easily recovered from the medium.

The microorganism employed in this invention is a strain capable of producing L-lysine selected from mutants resistant to one of the above-mentioned L-lysine metabolic antagonists, and is easily obtained by mutant-inducing methods well known in the art from parental strains selected from L-glutamic acid-producing microorganisms belonging to the genera Arthrobacter, Corynebacterium and Brevibacterium.

The microorganism employed in this invention has a stable L-lysine producing activity, which is induced genetically, and a decrease of this activity is not observed by back mutation.

In addition, because the microorganisms employed in this invention are strains which do not require for their growth a specific nutrient, the composition of the culturing medium employed in this invention is entirely conventional and economical.

There have been many cases of overproduction of metabolites by such mutants, which are obtained as mutants resistant to the analogues of the objective metabolites. Overproduction of L-lysine by these mutants resistant to the analogues, might be due to the decrease of feedback inhibition and repression genetically.

The culturing medium employed in this invention must contain an assimilable carbon source, an assimilable nitrogen source and the usual minor nutrients.

The carbon sources suitable for this invention are carbohydrates such as glucose, molasses, starch hydrolysates, organic acids such as acetic acid, alcohols such as methyl alcohol and hydrocarbons such as n-paraffins.

The nitrogen sources suitable for this invention are ammonium salts of inorganic acids such as ammonium sulphate and ammonium chloride, nitrate salts such as potassium nitrate, and sodium nitrate, ammonia in an aqueous solution or in the gaseous state, and urea.

The following is an experiment which shows the method of producing L-lysine by this invention.

a. The Synthesis of L-Lysine Analogues

We synthesized and obtained the next several new analogues of L-lysine. The analogues are listed in Table 1 and the following structural formulas.

Table 1

| Compound | Chemical Name |
|---|---|
| a | L-Lysine hydroxamate |
| b | S-(β-Amino ethyl)-L-cysteine hydroxamate |
| c | 3-(β-Amino ethyl-sulfinyl)-L-alanine (S-dl) |
| d | 3-[S-Methyl-S-(β-amino ethyl)-thio]-L-alanine |
| e | S-β-(2-pyridyl)ethyl-L-cysteine |
| f | S-β-(4-pyridyl)ethyl-L-cysteine |

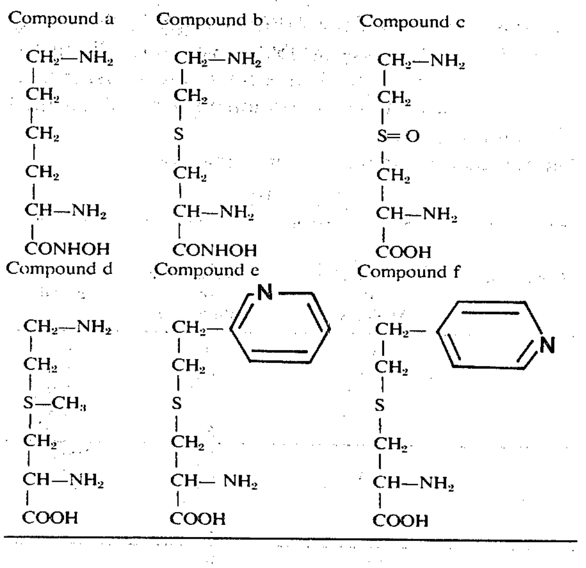

Compound *a* was synthesized from L-lysine ethyl ester and hydroxylamine.

Compound *b* was synthesized from ethylester of S-(β-Amino ethyl)-L-cysteine.HCl HCl and hydroxylamine.

Compound *c* was synthesized as follows:

S-(β-Amino ethyl)-L-cysteine.HCl was solved in acidic solution, and then oxidized with hydrogen peroxide or potassium periodate or iodine, and compound c was obtained as hydrogen chloride salt.

Hydrogen chloride salts of compound *d* was synthesized from S-(β-Amino ethyl)-L-cysteine.HCl and methyl iodate.

Compound *e* was synthesized from triethylamine and 2-vinyl pyridine.

Compound *f* was synthesized from triethylamine and 4-vinyl pyridine.

The results are summarized in Table II.

Table II

| | Anal. % Compound Calcd. C | H | N | O | S | Cl | Found C | H | N | O | S | Cl |
|---|---|---|---|---|---|---|---|---|---|---|---|---|
| a | 38.41 | 8.53 | 22.40 | 17.07 | — | 13.59 | 38.35 | 8.23 | 22.84 | 17.08 | — | 13.50 |
| b | 27.84 | 6.50 | 19.48 | 14.83 | 14.87 | 16.48 | 27.80 | 6.10 | 19.92 | 14.76 | 15.01 | 16.41 |
| c | 27.71 | 6.05 | 12.93 | 22.15 | 14.80 | 16.36 | 27.49 | 6.08 | 12.90 | 22.41 | 14.77 | 16.35 |
| d | 33.41 | 7.48 | 12.99 | 14.83 | 14.86 | 16.43 | 33.25 | 7.51 | 13.00 | 15.27 | 14.80 | 16.17 |
| e | 53.07 | 6.24 | 12.38 | 14.14 | 14.17 | — | 53.06 | 6.18 | 12.43 | 14.08 | 14.25 | — |
| f | 53.07 | 6.24 | 12.38 | 14.14 | 14.17 | — | 53.11 | 6.20 | 12.43 | 14.16 | 14.10 | — |

In order to test, whether these L-lysine analogues are L-lysine metabolic antagonists or not, two experiments consisting of the growth inhibition by these L-lysine analogues and the recovery of the growth from inhibition were examined as follows.

b. Growth Inhibition by L-lysine Analogues

Effect of these L-lysine analogues on the growth of Arthrobacter SP B-1 was estimated. The growing cells were inoculated in medium A containing L-lysine analogues and L-threonine in various concentrations and the turbidity was estimated after shaking culture for 16 hrs. The growth responses were indicated by the relative growth which the maximum growth of unsupplemented control tubes is indicated as 100%.

Medium A glucose 30g, Urea 5g, $K_2HPO_4$ 1g, $MgSO_4.7H_2O$ 0.5g, $FeSO_4.7H_2O$ 10mg, $MnSO_4.7H_2O$ 5mg, Biotin 5γ, Yeast extract 0.5g, L-threonine and L-lysine analogues various concentration in 1000ml distilled water at pH 7.0.

The results are summarized in Table III.

Table III

| Compound | mg/ml Concentration of Analogue | mg/ml Concentration of L-threonine | Relative growth |
|---|---|---|---|
| a | 0 | 0 | 100.0 |
| | 0.5 | 0.5 | 5.6 |
| | 1 | 1 | 2.9 |
| | 3 | 3 | 2.9 |
| | 5 | 5 | 2.9 |
| b | 0 | 0 | 100.0 |
| | 0.5 | 0.5 | 88.6 |
| | 1 | 1 | 50.7 |
| | 3 | 3 | 4.3 |
| | 5 | 5 | 4.3 |
| c | 0 | 0 | 100.0 |
| | 0.5 | 0.5 | 92.9 |
| | 1 | 1 | 80.0 |
| | 2 | 2 | 37.1 |
| | 3 | 3 | 9.3 |
| | 5 | 5 | 7.1 |
| d | 0 | 0 | 100.0 |
| | 0.5 | 0.5 | 20.0 |
| | 1 | 1 | 10.0 |
| | 2 | 2 | 7.1 |
| | 3 | 3 | 7.0 |
| | 5 | 5 | 7.0 |
| e | 0 | 0 | 100.0 |
| | 0.5 | 0.5 | 93.6 |
| | 1 | 1 | 80.7 |
| | 3 | 3 | 10.0 |
| | 5 | 5 | 4.3 |
| f | 0 | 0 | 100.0 |
| | 0.5 | 0.5 | 97.1 |
| | 1 | 1 | 82.9 |
| | 3 | 3 | 38.6 |
| | 5 | 5 | 10.7 |

As shown in Table III, the six L-lysine analogues inhibited the growth of Arthrobacter SP B-1.

c. Recovery of Growth from Inhibition

Effect of L-lysine on the recovery of growth of Arthrobacter SP B-1 from inhibition by these L-lysine analogues, was estimated. The growing cells were inoculated in medium containing L-lysine analogues, L-threonine and L-lysine in various concentration and the turbidity was estimated as the same method in (b) above-mentioned. The concentration of L-lysine necessary for recovery of growth from the inhibition was investigated. As shown in Table IV, L-lysine was effective in recovery of growth from inhibition by these L-lysine analogues.

From the data presented, it is apparent that these six L-lysine analogues are potent competitive inhibitors of L-lysine utilization and that these six L-lysine analogues are L-lysine metabolic antagonists. These data strongly suggested that L-lysine-producing mutants can be selected selecting for L-lysine analogue resistant mutants.

Table IV

| Compound | mg/ml Concentration of Analogue | mg/ml Concentration of L-threonine | mg/ml Concentration of L-lysine | Relative growth |
|---|---|---|---|---|
| a | 0.3 | 0.3 | 0 | 4.5 |
| | 0.3 | 0.3 | 1.0 | 52.1 |
| | 0.3 | 0.3 | 3.0 | 74.3 |
| | 0.3 | 0.3 | 5.0 | 83.6 |
| b | 2.0 | 2.0 | 0 | 14.3 |
| | 2.0 | 2.0 | 1.0 | 54.3 |
| | 2.0 | 2.0 | 3.0 | 84.2 |
| | 2.0 | 2.0 | 5.0 | 88.6 |
| c | 3.0 | 3.0 | 0 | 8.5 |
| | 3.0 | 3.0 | 1.0 | 62.9 |
| | 3.0 | 3.0 | 2.0 | 77.8 |
| | 3.0 | 3.0 | 3.0 | 81.3 |
| | 3.0 | 3.0 | 5.0 | 81.3 |
| d | 1.0 | 1.0 | 0 | 10.0 |
| | 1.0 | 1.0 | 1.0 | 82.8 |
| | 1.0 | 1.0 | 2.0 | 90.7 |
| | 1.0 | 1.0 | 3.0 | 92.8 |
| | 1.0 | 1.0 | 5.0 | 92.8 |
| e | 3.0 | 3.0 | 0 | 11.4 |
| | 3.0 | 3.0 | 1.0 | 64.5 |
| | 3.0 | 3.0 | 3.0 | 89.3 |
| | 3.0 | 3.0 | 5.0 | 89.3 |
| f | 5.0 | 5.0 | 0 | 20.0 |
| | 5.0 | 5.0 | 1.0 | 92.8 |
| | 5.0 | 5.0 | 3.0 | 99.2 |
| | 5.0 | 5.0 | 5.0 | 99.2 |

d. Isolation of L-Lysine Analogue-Resistant Mutants

Overnight cultured growing cells of Arthrobacter SP B-1 or Corynebacterium SP 18S or Brevibacterium SP B-4 in medium B were washed and suspended in 0.1 M phosphate buffer.

Medium B

Polypeptone 10g, Yeast extract 10g, NaCl 5g, in 1000ml tap water at pH 7.0

Then they were treated with N-methyl-N-nitro-N′-nitrosoguanidine in 0.1 M phosphate buffer at the concentration of 300γ/ml for 30 min. at 0° – 3°C. Then washed and inoculated directly onto minimal medium C supplemented with L-lysine analogue.

Medium C glucose 15g, $(NH_4)_2SO_4$ 1.5g, urea 1.5g, $KH_2PO_4$ 1g, $K_2HPO_4$ 1g, $MgSO_4.7H_2O$ 0.1g, thiamine HCl 100γ, d-biotin 30γ, L-lysine analogue 1g, L-threonine 1g, agar 20g, in 1000ml distilled water at pH 7.0.

Colonies appearing on the surface of agar plate during 2 – 7 days' incubation were picked up as L-lysine analogue resistant mutants. For each L-lysine analogue, 500 resistant mutants were obtained.

e. Production of L-Lysine by L-Lysine Analogue Resistant Mutants

Accumulation of L-lysine by these analogue resistant mutants was examined by incubation with aeration in 20ml of medium D at 30°C for 72 hrs. in culture flasks. L-lysine produced was determined by the manometric method using lysine decarboxylase of *Bacterium cadaveris*. Mutants that produced L-lysine monohydrochloride in good yield are summarized in Table V.

Table V

| Resistant to Compound | Parent strain | Resistant Mutant No. | FERM-P No. ATCC NO. | L-Lysine HCl produced g/L |
|---|---|---|---|---|
| a | Arthrobacter SP B-1 | 1772–193 | 1295 / 21868 | 23.8 |
| | | 501 | | 17.3 |
| | | 1002 | | 21.5 |
| | | 1798 | | 12.1 |
| a | Brevibacterium SP B-4 | 1443–54 | 1299 / 21864 | 28.5 |
| | | 1401 | | 21.8 |
| | | 1405 | | 10.2 |
| | | 1477 | | 15.6 |
| b | Arthrobacter SP B-1 | 874–75 | 1302 / 21861 | 41.5 |
| | | 349 | | 23.4 |
| | | 1008 | | 38.2 |
| | | 1067 | | 37.6 |
| | | 301 | | 15.7 |
| b | Corynebacterium SP 18S | 351–23 | 1301 / 21862 | 39.8 |
| | | 391 | | 18.9 |
| | | 1068 | | 26.1 |
| | | 1100 | | 35.3 |
| | | 1306 | | 32.9 |
| b | Brevibacterium SP B-4 | 1304–31 | 1303 / 21860 | 42.7 |
| | | 1509 | | 26.4 |
| | | 1513 | | 37.4 |
| | | 1301 | | 38.9 |
| | | 1306 | | 11.2 |
| c | Arthrobacter SP B-1 | 55–8 | 1296 / 21867 | 15.3 |
| | | 67 | | 13.8 |
| | | 80 | | 14.9 |
| | | 33 | | 12.2 |
| | | 72 | | 14.7 |
| c | Brevibacterium SP B-4 | 1899–31 | 1298 / 21865 | 18.1 |
| | | 1580 | | 14.8 |
| | | 1560 | | 13.1 |
| | | 1922 | | 16.9 |
| | | 1955 | | 18.0 |
| d | Arthrobacter SP B-1 | 1162–166 | 1304 / 21859 | 39.4 |
| | | 417 | | 38.4 |
| | | 1155 | | 24.3 |
| | | 1179 | | 27.1 |
| | | 820 | | 18.8 |
| d | Corynebacterium SO 18S | 1202–138 | 1306 / 21857 | 42.4 |
| | | 1137 | | 40.7 |
| | | 1217 | | 29.8 |
| | | 1227 | | 31.0 |
| | | 1206 | | 27.5 |
| d | Brevibacterium SP B-4 | 1506–13 | 1297 / 21866 | 32.8 |
| | | 1501 | | 29.7 |
| | | 1829 | | 20.3 |
| | | 1834 | | 18.6 |
| | | 1839 | | 21.4 |
| e | Arthrobacter SP B-1 | 269–51 | 1305 / 21858 | 23.0 |
| | | 6 | | 16.5 |
| | | 127 | | 12.1 |
| | | 362 | | 10.7 |
| | | 493 | | 13.5 |
| f | Corynebacterium SP 18S | 738–26 | 1300 / 21863 | 19.0 |
| | | 225 | | 12.4 |
| | | 341 | | 17.2 |
| | | 755 | | 13.3 |
| | | 791 | | 13.1 |

As shown in Table V, it is apparent that these analogue resistant mutants have high L-lysine-producing ability.

f. The Recovery of L-Lysine from the Culture Broth

The recovery of L-lysine from the culture broth may follow known methods. The culture broth is filtered to remove the cells. The filtrate is passed through a column of cation exchange resin. The resin column is eluted with aqueous ammonia, and L-lysine monohydrochloride crystalline is obtained under reduced pressure and a precipitation method.

The invention is illustrated by the following examples.

EXAMPLE 1

A fermentation medium was prepared to the following composition.

| | | |
|---|---|---|
| Glucose | 160 | g/L |
| Ammonium sulfate | 20 | g/L |
| $K_2HPO_4$ | 1 | " |
| $MgSO_4 \cdot 7H_2O$ | 0.4 | " |
| $FeSO_4 \cdot 7H_2O$ | 0.01 | " |
| $MnSO_4 \cdot 7H_2O$ | 0.01 | " |
| Casaminoic acid | 0.2 | " |
| Biotin | 300 | Mg/L |
| Thiamine hydrochloride | 200 | " |
| $CaCO_3$ | 25 | g/L |
| Urea | 8 | " |
| pH 7.5 | | |

10l of the medium were introduced into 20l Jar Fermentor, and were sterilized at 110°C for 30 min.

The medium was inoculated with the microorganisms shown in Table VI and incubated at pH 7.5 – 7.8, agitation rate 600 – 650 rpm, aeration rate 1l/l/min., and temperature 30° – 32°C.

After completion of the fermentation, L-lysine produced was determined by Warburg method and recovered by ion-exchange procedure.

The results are listed in Table VI.

Table VI

| Strain | Culturing duration (hrs.) | L-lysine·HCl produced g/L | L-lysine·HCl recovered g |
|---|---|---|---|
| Arthrobacter SP B-1 No. 874–75 FERM-P No. 1302 ATCC No. 21861 | 89 | 43.8 | 385 |
| Arthrobacter SP B-1 No. 1162–166 FERM-P No. 1304 ATCC No. 21859 | 76 | 41.9 | 366 |
| Brevibacterium SP B-4 No. 1506–13 FERM-P No. 1297 ATCC No. 21866 | 76 | 39.7 | |
| Arthrobacter SP B-1 No. 269–51 FERM-P No. 1305 ATCC No. 21858 | 72 | 35.5 | 288 |
| Corynebacterium SP 18S No. 738–26 FERM-P No. 1300 ATCC No. 21863 | 69 | 25.7 | |

EXAMPLE 2

A fermentation medium was prepared to the following composition:

| | |
|---|---|
| Cane molasses | 350 g/L |
| Ammonium sulfate | 55 g/L |
| pH 7.5 ~ 8.0 | |

The medium was treated in the same way as mentioned in Example 1, except that it was inoculated with the microorganisms shown in Table VII.

Table VII

| Strain | Culturing duration (hrs.) | L-lysine·HCl produced (g/L) |
|---|---|---|
| Corynebacterium SP 18S No. 351–23 FERM-P No. 1301 ATCC No.21862 | 83 | 33.8 |
| Arthrobacter SP B-1 No. 1772–193 FERM-P No. 1295 ATCC No. 21868 | 89 | 15.7 |
| Corynebacterium SP 18S No. 1202–138 Ferm-P No. 1306 ATCC No. 21857 | 81 | 44.2 |
| Brevibacterium SP B-4 No. 1899–31 FERM-P No. 1298 ATCC No. 21865 | 94 | 22.1 |
| Corynebacterium SP 18S No. 738–26 FERM-P No. 1300 ATCC No.21863 | 96 | 38.6 |

EXAMPLE 3

A fermentation medium was prepared to the following composition:

| | | |
|---|---|---|
| Acetic acid | 6 | g/L |
| Ammonium acetate | 6 | g/L |
| Glucose | 5 | " |
| Ammonium sulfate | 5 | " |
| $KH_2PO_4$ | 1 | " |
| $MgSO_4 \cdot 7H_2O$ | 0.5 | " |
| Biotin | 50 | Mg/L |
| Thiamine hydrochloride | 200 | " |
| Urea | 1 | g/L |

The medium prepared in the same way as mentioned in Example 1 was inoculated with Brevibacterium SP B-4 No. 1304-31, FERM-P No. 1303, ATCC No. 21860, and incubated for 76 hrs.

After completion of the fermentation, L-lysine.HCl was in a concentration of 12.7 grams per liter of the medium.

EXAMPLE 4

A fermentation medium was prepared to the following composition:

| | | |
|---|---|---|
| n-Paraffins | 50 | g/L |
| Ammonium sulfate | 5 | " |
| $KH_2PO_4$ | 2 | " |
| $MgSO_4 \cdot 7H_2O$ | 1 | " |
| $FeSO_4 \cdot 7H_2O$ | 0.01 | " |
| $MnSO_4 \cdot 7H_2O$ | 0.01 | " |
| $CaCO_3$ | 20 | " |
| pH 7.0 | | |

20 ml of the medium were introduced into 500 ml flask, and were sterilized at 120°C for 10 min. The medium was inoculated with Arthrobacter SP B-1 No. 55-8, FERM-P No. 1296, ATCC No. 21867 and was incubated at 30°C with agitation for 72 hrs. After completion of the fermentation, L-lysine·HCl was produced in a concentration of 4.1 grams per liter of the medium.

The ATCC numbers appearing in the present specification and claims are the depository numbers under which the strains are deposited in the American Type Culture Collection, Rockville, Md. All restrictions on the availability to the public of these strains will be irrecovably removed upon the granting of the present patent and the deposits will be maintained to assure the permanent availability thereof to the public during the life of the present patent.

It will be obvious to those skilled in the art that various changes may be made without departing from the spirit of the invention, and therefore the invention is not limited to what is shown in the drawings and described in the specification but only as indicated in the appended claims.

What is claimed is:

1. A method of producing L-lysine by microorganisms which comprises culturing under aerobic conditions, an L-lysine-producing mutant selected from the group consisting of Arthobacter B-1 No. 1772-193, FERM-P No. 1295, ATCC No. 21868, Arthrobacter B-1 No. 55-8, FERM-P No. 1296, ATCC No. 21867, Brevibacterium B-4 No. 1506-13, FERM-P No. 1297, ATCC No. 21866, Brevibacterium B-4 No. 1899-31, FERM-P No. 1298, ATCC No. 28165, Brevibacterium B-4 No. 1433-54, FERM-P No. 1299, ATCC No. 21864,
Corynebacterium 18S No. 728-26, FERM-P No. 1300, ATCC No. 21863,
Corynebacterium 18S No. 351-23, FERM-P No. 1301, ATCC No. 21862,
Arthrobacter B-1 No. 874-75, FERM-P No. 1302, ATCC No. 21861,
Brevibacterium B-4, No. 1304-31, FERM-P No. 1303, ATCC No. 28160,
Arthrobacter B-1 No. 1162-166, FERM-P No. 1304, ATCC No. 28159,
Arthrobacter B-1 No. 269-51, FERM-P No. 1305, ATCC No. 28158, and
Corynebacterium 18S No. 1202-138, FERM-P No. 1306, ATCC No. 21857 and being resistant to one of the metabolic antagonists consisting of:

a. L-lysine hydroxamate
b. S-($\beta$-amino ethyl)-L-cysteine hydroxamate
c. 3-($\beta$-amino ethyl-sulfinyl)-L-alanine (S-dl)
d. 3[S-methyl-S-($\beta$-amino ethyl)-thio]-L-alanine
e. S-$\beta$-(2-pyridyl)ethyl-L-cysteine, and
f. S-$\beta$-(4-pyridyl)ethyl-L-cysteine in a medium containing at least one assimilable carbon source, a nitrogen source and inorganic and growth-promoting constituents, maintaining the pH value of the culturing medium within a range of from 5 to 8.5 until a substantial amount of L-lysine is accumulated in said medium and recovering L-lysine from the medium.

2. A method according to claim 1, wherein the assimilable carbon source is an organic acid or a salt thereof.

3. A method according to claim 1, wherein the assimilable carbon source is hydrocarbons.

4. A method according to claim 1, wherein the assimilable carbon source is alcohols.

5. A method according to claim 1, wherein the assimilable carbon source is a carbohydrate.

6. A method according to claim 1, wherein the assimilable nitrogen source is ammonia, an ammonium salt or urea.

* * * * *

UNITED STATES PATENT OFFICE
CERTIFICATE OF CORRECTION

PATENT NO. : 3,905,867
DATED : September 16, 1975
INVENTOR(S) : Yasuo KURIMURA et al It is certified that error appears in the above-identified patent and that said Letters Patent are hereby corrected as shown below:

[57] ABSTRACT, line 1, delete "-L-alanine," and insert therefor --culturing-- line 9, "alamine" should read --alanine--

Column 2, line 55, delete "HCl" second occurrence

Column 4, line 35, insert --by-- after "selected"

UNITED STATES PATENT OFFICE

CERTIFICATE OF CORRECTION

PATENT NO. : 3,905,867

DATED : September 16, 1975

INVENTOR(S) : KURIMURA et al

It is certified that error appears in the above-identified patent and that said Letters Patent are hereby corrected as shown below:

Column 8, line 67 should read --1298, ATCC No. 21865,--

Column 9, line 10 should read --1303, ATCC No. 21860,--

" line 12 should read --ATCC No. 21859,--

" line 14 should read --ATCC No. 21858, and--

Signed and Sealed this

*seventeenth* Day of *February 1976*

[SEAL]

*Attest:*

RUTH C. MASON
*Attesting Officer*

C. MARSHALL DANN
*Commissioner of Patents and Trademarks*